(12) United States Patent
Rose et al.

(10) Patent No.: US 8,387,129 B2
(45) Date of Patent: Feb. 26, 2013

(54) METHOD AND APPARATUS FOR VERIFYING DATA PACKET INTEGRITY IN A STREAMING DATA CHANNEL

(75) Inventors: Gregory Gordon Rose, San Diego, CA (US); David Jonathan Julian, San Diego, CA (US); Lu Xiao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 983 days.

(21) Appl. No.: 12/135,976

(22) Filed: Jun. 9, 2008

(65) Prior Publication Data
US 2009/0307766 A1    Dec. 10, 2009

(51) Int. Cl.
*G06F 17/00* (2006.01)
*H04L 9/32* (2006.01)
(52) U.S. Cl. .............................. 726/13; 713/168; 705/75
(58) Field of Classification Search .......................... None
See application file for complete search history.

(56) References Cited

U.S. PATENT DOCUMENTS

| | | | |
|---|---|---|---|
| 6,986,161 B2* | 1/2006 | Billhartz | 726/23 |
| 6,996,712 B1* | 2/2006 | Perlman et al. | 713/161 |
| 7,120,443 B2 | 10/2006 | Malladi et al. | |
| 7,251,215 B1* | 7/2007 | Turner et al. | 370/231 |
| 7,295,831 B2* | 11/2007 | Coleman et al. | 455/410 |
| 7,298,840 B2* | 11/2007 | Gehrmann et al. | 380/36 |
| 7,437,771 B2 | 10/2008 | Alkove et al. | |
| 7,516,487 B1* | 4/2009 | Szeto et al. | 726/22 |
| 7,953,389 B2* | 5/2011 | Coleman et al. | 455/410 |
| 2009/0327736 A1* | 12/2009 | Cam-Winget et al. | 713/181 |

FOREIGN PATENT DOCUMENTS

| | | |
|---|---|---|
| EP | 0952700 A2 | 10/1999 |
| EP | 1615370 A1 | 1/2006 |
| RU | 2005138512 A | 5/2006 |
| RU | 2005111507 A | 10/2006 |
| RU | 2005113932 A | 11/2006 |
| RU | 2292122 C1 | 1/2007 |
| WO | WO 00/49764 | 8/2000 |
| WO | WO03003644 A1 | 1/2003 |
| WO | WO2007111721 A2 | 10/2007 |

OTHER PUBLICATIONS

International Search Report and Written Opinion—PCT/US2009/046631—ISA/EPO—Mar. 9, 2010.

* cited by examiner

*Primary Examiner* — William Powers
(74) *Attorney, Agent, or Firm* — Won Tae Kim (57) ABSTRACT

Disclosed is a method for verifying data packet integrity in a streaming-data channel. In the method, data packets are received from the streaming-data channel. Each data packet includes a data payload and a corresponding message integrity code. The received data packets are processed in a first processing mode, wherein the received data packets are forwarded to an application module before checking the integrity of the data packets using the respective message integrity codes. An integrity-check-failure measurement is generated for monitoring an integrity-check-failure rate in the first processing mode. If the integrity-check-failure measurement exceeds an integrity-check threshold, then the method transitions to a second processing mode. A received data packet is forwarded to the application module in the second processing mode only after passing the integrity check.

49 Claims, 4 Drawing Sheets

METHOD AND APPARATUS FOR VERIFYING DATA PACKET INTEGRITY IN A STREAMING DATA CHANNEL

BACKGROUND

1. Field

The present invention relates generally to wireless communications, and more specifically to data security in a streaming data channel.

2. Background

The field of communications has many applications including, e.g., paging, wireless local loops, Internet telephony, and satellite communication systems. An exemplary application is a cellular telephone system for mobile subscribers. (As used herein, the term "cellular" system encompasses both cellular and personal communications services (PCS) system frequencies.) Modern communication systems, such as a wireless communication system, designed to allow multiple users to access a common communications medium have been developed for such cellular systems. These modern communication systems may be based on multiple access techniques such as code division multiple access (CDMA), time division multiple access (TDMA), frequency division multiple access (FDMA), space division multiple access (SDMA), polarization division multiple access (PDMA), or other modulation techniques known in the art. These modulation techniques demodulate signals received from multiple users of a communication system, thereby enabling an increase in the capacity of the communication system. In connection therewith, various wireless communication systems have been established including, e.g., Advanced Mobile Phone Service (AMPS), Global System for Mobile communication (GSM), and other wireless systems.

In FDMA systems, the total frequency spectrum is divided into a number of smaller sub-bands and each user is given its own sub-band to access the communication medium. Alternatively, in TDMA systems, the total frequency spectrum is divided into a number of smaller sub-bands, each sub-band is shared among a number of users, and each user is allowed to transmit in predetermined time slots using that sub-band. A CDMA system provides potential advantages over other types of systems, including increased system capacity. In CDMA systems, each user is given the entire frequency spectrum for all of the time, but distinguishes its transmission through the use of a unique code.

In lower power wireless standards, such as Bluetooth or other technologies that may permit an extremely low-power personal network, packet-level data integrity protection is either unavailable or only optional. When packet-level integrity information is available, existing approaches fail to provide a combination of timely security and real-time performance.

There is therefore a need in the art for adequate real-time performance in combination with effective packet-level data integrity protection in a relatively low-power and/or bandwidth-limited streaming data channel.

SUMMARY

An aspect of the present invention may reside in a method for verifying data packet integrity in a streaming data channel. In the method, data packets are received from the streaming-data channel. Each data packet includes a data payload and a corresponding message integrity code. The received data packets are processed in a first processing mode, wherein the received data packets are forwarded to an application module before checking the integrity of the data packets using the respective message integrity codes. An integrity-check-failure measurement is generated for monitoring an integrity-check-failure rate in the first processing mode. If the integrity-check-failure measurement exceeds an integrity-check threshold, then the method transitions to a second processing mode. A received data packet is forwarded to the application module in the second processing mode only after passing the integrity check.

In more detailed aspects of the invention, a reception time for receiving a data packet over a bandwidth-limited streaming data channel may exceed a noticeable delay time, or may exceed about 50 milliseconds. The power consumed in the first processing mode may less than the power consumed in the second processing mode. The first processing mode may be performed using an application specific integrated circuit (ASIC), and second processing mode may be performed using a programmable processor.

In other more detailed aspects of the invention, the integrity check failure measurement may be a count of each data packet failing the integrity check in the first processing mode. The integrity-check threshold may comprise one data packet failing the integrity check, or it may comprise at least two consecutive data packets failing the integrity check. In the second processing mode, a data packet having failed an integrity check may be discarded, or may be analyzed for a security assessment. The application module may include an audio processing circuit.

Further, the method may include generating an integrity-check-success measurement for monitoring an integrity-check-success rate in the second processing mode. If the integrity-check-success measurement exceeds an integrity-check-success threshold, then the method may transition to the first processing mode.

Another aspect of the invention may reside in an apparatus for verifying data packet integrity in a streaming-data channel, comprising: means for receiving data packets from the streaming-data channel, wherein each data packet comprises a data payload and a corresponding message integrity code; means for processing the received data packets in a first processing mode, wherein the received data packets are forwarded to an application module before checking the integrity of the data packets using the respective message integrity codes; means for generating an integrity-check-failure measurement for monitoring an integrity check-failure-rate in the first processing mode; and means for transitioning to a second processing mode if the integrity-check-failure measurement exceeds an integrity-check threshold, wherein, in the second processing mode, a received data packet is forwarded to the application module only after passing the integrity check. The apparatus may comprise a watch, a headset, or a sensing device, for wireless communication.

Yet another aspect of the invention may reside is computer program product comprising computer readable medium comprising: code for causing a computer to receive data packets from a streaming data channel wherein each data packet comprises a data payload and a corresponding message integrity code, code for causing a computer to processing received data packets in a first processing mode wherein the received data packets are forwarded to an application module before checking the integrity of the data packets using the respective message integrity codes, code for causing a computer to generate an integrity-check-failure measurement for monitoring an integrity-check-failure rate in the first processing mode, and code for causing a computer to transition to a second processing mode if the integrity-check-failure measurement exceeds an integrity-check threshold, wherein, in the second processing mode, a received data packet is forwarded to the application module only after passing the integrity check.

Another aspect of the invention may reside in an apparatus, for verifying data packet integrity in a streaming-data channel, comprising a receiver, a first processor, and a second processor. The receiver is configured to receive data packets from the streaming-data channel, wherein each data packet includes a data payload and a corresponding message integrity code. The first processor is configured to process the received data packets in a first processing mode, wherein the received data packets are forwarded to an application module before checking the integrity of the data packets using the respective message integrity codes, generate an integrity-check-failure measurement for monitoring an integrity-check-failure rate in the first processing mode, and transition to a second processing mode performed by second processor if the integrity-check-failure measurement exceeds an integrity-check threshold. The second processor is configured to forward a received data packet to the application module, in the second processing mode, only after the received packet passes an integrity check.

DETAILED DESCRIPTION

The word "exemplary" is used herein to mean "serving as an example, instance, or illustration." Any embodiment described herein as "exemplary" is not necessarily to be construed as preferred or advantageous over other embodiments.

A remote station, also known as a mobile station (MS), an access terminal (AT), user equipment or subscriber unit, may be mobile or stationary, and may communicate with one or more base stations, also known as base transceiver stations (BTSs) or node Bs. A remote station transmits and receives data packets through one or more base stations to a base station controller, also known as radio network controllers (RNCs). Base stations and base station controllers are parts of a network called an access network. An access network transports data packets between multiple remote stations. The access network may be further connected to additional networks outside the access network, such as a corporate intranet or the Internet, and may transport data packets between each remote station and such outside networks. A remote station that has established an active traffic channel connection with one or more base stations is called an active remote station, and is said to be in a traffic state. A remote station that is in the process of establishing an active traffic channel connection with one or more base stations is said to be in a connection setup state. A remote station may be any data device that communicates through a wireless channel. A remote station may further be any of a number of types of devices including but not limited to PC card, compact flash, external or internal modem, or wireless phone. The communication link through which the remote station sends signals to the base station is called an uplink, also known as a reverse link. The communication link through which a base station sends signals to a remote station is called a downlink, also known as a forward link.

Figure 1:
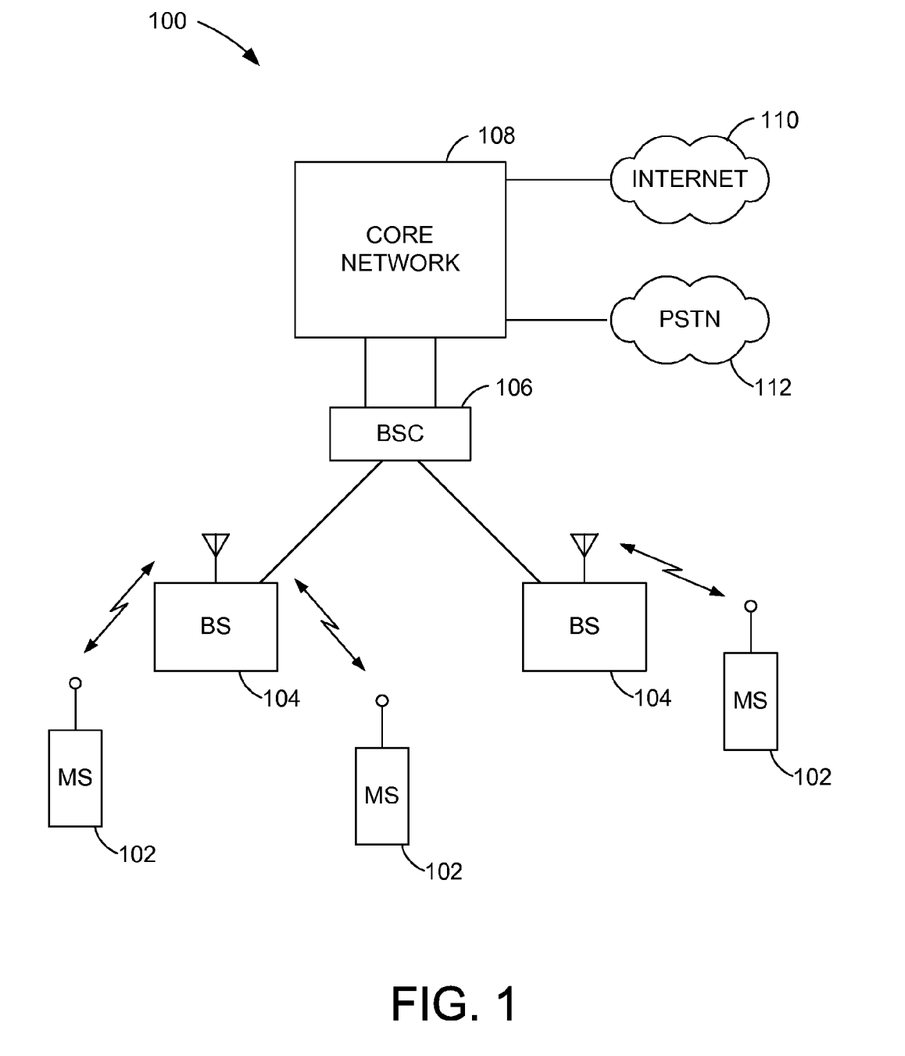
FIG. 1 is a block diagram of an example of a wireless communication system.

With reference to FIG. 1, a wireless communication system 100 includes one or more wireless mobile stations (MS) 102, one or more base stations (BS) 104, one or more base station controllers (BSC) 106, and a core network 108. Core network may be connected to an Internet 110 and a Public Switched Telephone Network (PSTN) 112 via suitable backhauls. A typical wireless mobile station may include a handheld phone, or a laptop computer. Wireless communication system 100 may employ any one of a number of multiple access techniques such as code division multiple access (CDMA), time division multiple access (TDMA), frequency division multiple access (FDMA), space division multiple access (SDMA), polarization division multiple access (PDMA), or other modulation techniques known in the art.

Figure 2:
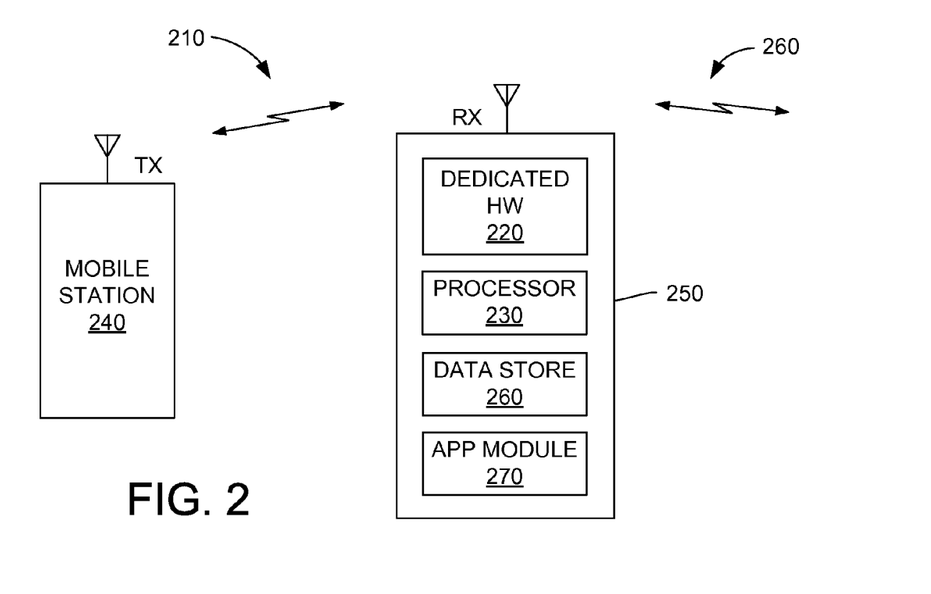
FIG. 2 is a block diagram of a mobile station communicating with a low-power receiving device over a streaming-data channel.

With reference to FIG. 2, a mobile station 240, such as a mobile phone, may transmit data packets to a low-power receiving RX device 250 over a streaming data channel 210. The RX device may further include a data store 260, such as a memory device, and an application module 270. In other configurations, the receiving RX device may be a mobile phone, audio headset, video player, or similar audio/video device. Further, the transmitting TX device 240 may be a radio, music player, personal digital assistant (PDA), mobile phone, or the like. Further, each device may be configured with both a TX device and an RX device to communicate in a duplex mode over separate streaming-data channels. Further, the wireless devices, 240 and 250, may be peer devices in, for example, a low-power, low-latency peer-to-peer network.

Figure 3:
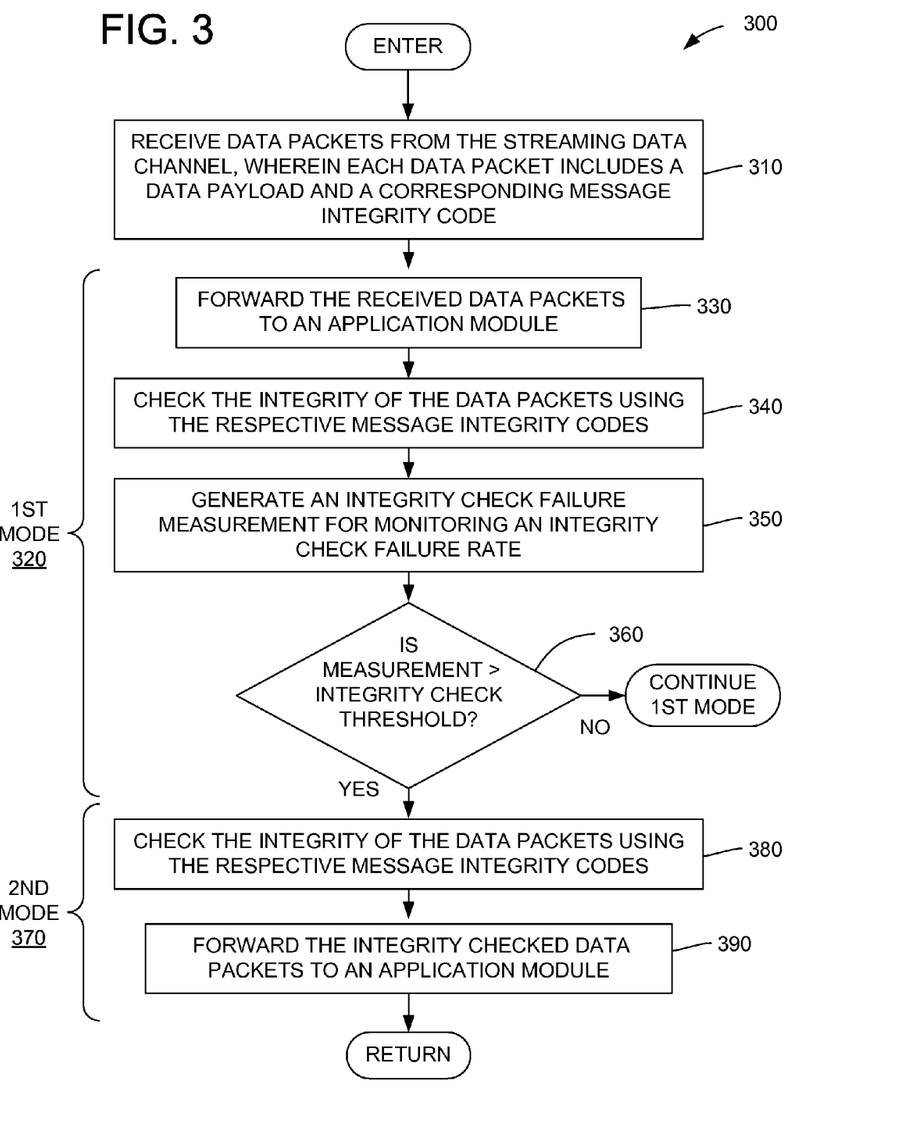
FIG. 3 is a flow diagram of a method for verifying data packet integrity in a streaming-data channel.
Figure 4:
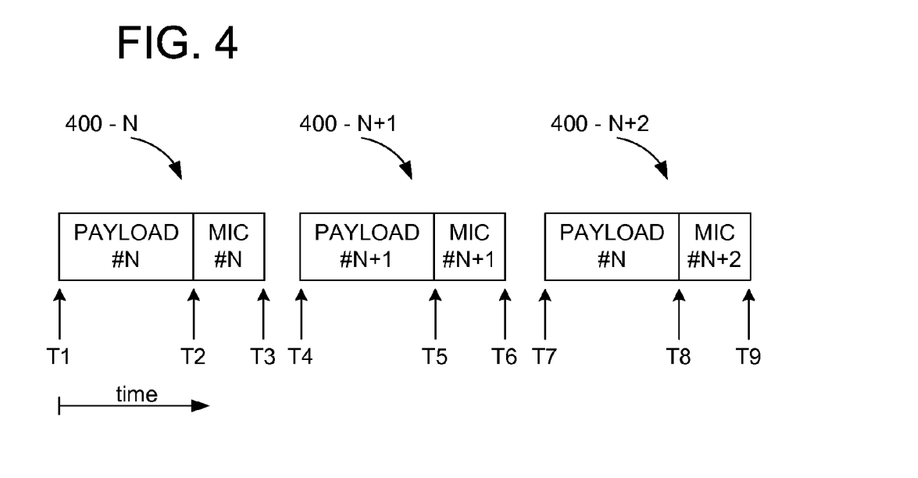
FIG. 4 is a schematic diagram of data packets having accompanying integrity information, with respect to time.

With reference to FIGS. 3 and 4, an aspect of the present invention may reside in a method 300 for verifying data packet integrity in a streaming-data channel 210. In the method, data packets 400 are received from the streaming-data channel (step 310). Each data packet includes a data payload and a corresponding message integrity code MIC. The received data packets are processed in a first processing mode 320, wherein the received data packets are forwarded to an application module 270 (step 330) before checking the integrity of the data packets using the respective message integrity codes (step 340). An integrity-check-failure measurement is generated for monitoring an integrity-check-failure rate in the first processing mode (step 350). If the integrity-check-failure measurement exceeds an integrity-check threshold (step 360), then the method transitions to a second processing mode 370. A received data packet is forwarded to the application module (step 390) in the second processing mode only after passing the integrity check (step 380).

In more detailed aspects of the invention, a reception time for receiving a data packet 400 over the streaming-data channel 210 may exceed a noticeable delay time, or may exceed about 50 milliseconds. The power consumed in the first processing mode may be less than the power consumed in the second processing mode. As examples, the first processing mode may be performed using dedicated hardware 220, such as an application specific integrated circuit (ASIC), and second processing mode is performed using a programmable processor 230, such as an ARM processor. The MIC may be based on a hash of the data payload and a secret key.

Further, the method 300 may include generating an integrity-check-success measurement for monitoring an integrity-check-success rate in the second processing mode 370. If the integrity-check-success measurement exceeds an integrity-check-success threshold, then the method may transition to the first processing mode 320.

The present invention allows real-time performance while maintaining data integrity and security. For a data packet 400-N with a payload #N, T1 is the start time for receiving the payload, T2 is the start time for receiving the MIC #N, and T3 is the start time for verifying the MIC. In the first processing mode 320, the data in the payload #N is delivered to the application layer or module 270 during the time between T1 and T2, rather than waiting for time T3. If the MIC verification fails, then the device may transition to the second processing mode 370 before time T4 and the reception of the payload #N+1. The combination of the channel bandwidth and the packet size determines the delay between times T1 and T3.

As an example of an application in which real-time response is very important is a wireless headset (RX device 250) connected to a mobile phone or station 240. The headset must get an audio signal from the phone and perform noise/echo cancellation in real time. A delay caused by headset processing should not be noticed during a phone conversation. Thus, it is desirable to reduce transmission and processing delay.

The headset receives the audio data from the mobile phone in the form of streaming data packets. Authentication of the data packets ensures that the packets come from the phone and not from a hacker or the like. A message integrity code (MIC) is generated by the mobile phone and attached to the end of a respective packet 400. The MIC covers all of the authenticated data. The mobile phone (transmitter TX) and the headset (receiver RX) share a secret key for message authentication so that only the mobile phone can create a MIC and only the headset can verify the MIC after having received the data packet over the streaming-data channel 210. Advantageously, the data rate of the channel 210 may be bandwidth limited to save power, reduce clock drift, etc.

A hacker may attempt to introduce counterfeit data packets by another wireless signal 260. It is assumed that the hacker may modify the payload but cannot control its content. This assumption is valid when the payload is encrypted. For streaming data, it desirable to use a stream cipher or a block cipher in counter mode for encryption.

In one aspect of the invention, the receiving device 250 determines when to verify the MIC field based on the validity of a previous packet 400. If a previous data packet contained a valid MIC, the MIC in the current packet is verified after the payload is delivered to an upper or application layer or module 270. If the previous packet contains a fake MIC, the MIC in the current packet is verified before the payload is delivered to the application module or upper layer.

For example, in FIG. 4, the MIC field of packet #N is checked before the processing of packet #N+1. If the MIC for packet #N is valid, the payload of packet #N+1 is delivered at time T4 since it is highly likely that packet #N+1 is also valid. As a result, the delay from T4 to T6 may be avoided for improved real-time performance. However, if packet N+1 is found to be invalid at time T6, the next packet may be invalid. Therefore, the payload of packet #N+2 may not be delivered until its MIC is validated at time T9. The delivery of the payload of packet #N+2 depends on the MIC verification result. If the packet #N+2 passes the MIC check at time T9, the application module may skip this particular packet to reduce latency and prepare for real-time processing of the next packet #N+3 (not shown). The corrupted or illicit packet #N+1 may affect performance (e.g., noise in the headset). However, the delay from T7 to T9 does not further affect performance since no sound is generally better than annoying noise.

Annoying noise events may come from burst errors or fabricated data, rather than from common transmission errors. Fabricated data may pass error detection based on, for example, a CRC check, but it cannot circumvent the MIC verification. However, the MIC verification catches both fabricated data and transmission errors. To lower system sensitivity to common transmission errors, such as a few single bit errors in a long packet, two methods may be undertaken. In one, an error correcting technique may be used before MIC verification. In another, the decision on when to verify the MIC filed may be based on the validity of several previous packets. For example, the MIC is verified first if a certain continuous number of previous packets fail MIC verification.

For example, the integrity-check-failure measurement may be a count of each data packet 400 failing the integrity check in the first processing mode 320. The integrity-check threshold may comprise one data packet failing the integrity check, or it may comprise at least two consecutive data packets failing the integrity check.

Figure 5:
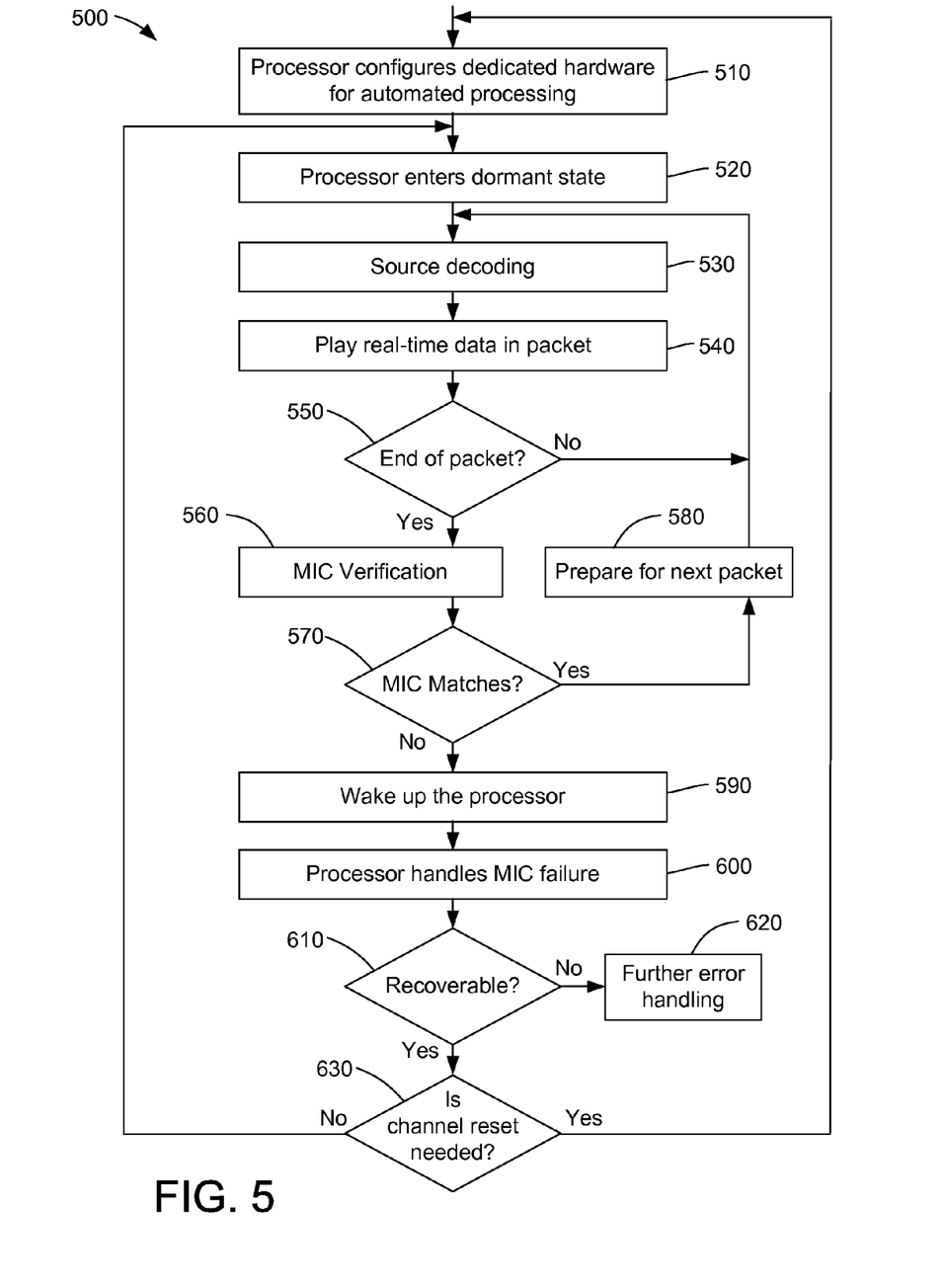
FIG. 5 is a flow diagram of packet processing for integrity in a in a low-power receiving device.

With reference to FIG. 5, a flow chart 500 is shown of packet processing in the low-power receiving device 250. The processor 230 configures the dedicated hardware 220 for automated processing (step 510). The processor enters a dormant state thus lowering the power consumption of the low-power receiving device 250 (step 520). The dedicated hardware decodes the source data packets 400 received over the streaming-data channel 210 (step 530). In accordance with the first processing mode 320, the data packets are forwarded to the application module or layer 270 for play in real time (step 540). The dedicated hardware checks for the end of the packet and continues decoding and playing data in the packet until the end of the packet is reached (step 550). After the complete data payload and MIC are received, the MIC is verified (step 560). If the MIC matches (step 570), the device is prepared to receive the next data packet 400 (step 580). If the MIC does not match, the device wakes up the processor (step 590) and the device enters the second processing mode 370. The processor handles the MIC failure (step 600) as described above with respect to FIG. 3. If the failure is not recoverable (step 610), further error handling is performed to determine, for example, whether a security threat exists (step 620). If the failure is recoverable, such as a one time MIC failure, then the processor determines whether the data channel needs to be reset (step 630). If not, the process continues at step 520 where the processor enters the dormant state and the device transitions back to the first processing mode 320. Otherwise, the processor reinitializes the device by returning to step 510. The dedicated hardware (e.g. ASIC) has good power efficiency.

In the second processing mode 370, a data packet having failed an integrity check may discarded, or may be analyzed for a security assessment. For example, one MIC failure may be a chance error. Two MIC failures may be a coincidence. However, three MIC failure may be indicate that an attack is under way.

The application module may include an audio processing circuit. The noticeable delay time may depend on the application. For example, an activity such as listening to music may be more tolerant of delays over an activity involving a telephone conversation.

Another aspect of the invention may reside in an apparatus 250 for verifying data packet integrity in a streaming-data channel 210. The apparatus includes means for receiving data packets 400 from the streaming-data channel 210 wherein each data packet comprises a data payload and a corresponding message integrity code MIC, means for processing the received data packets in a first processing mode 320 wherein the received data packets are forwarded to an application module 270 before checking the integrity of the data packets using the respective message integrity codes, means for generating an integrity-check-failure measurement for monitoring an integrity-check-failure rate in the first processing mode, and means for transitioning to a second processing mode 370 if the integrity-check-failure measurement exceeds an integrity-check threshold, wherein, in the second processing mode, a received data packet is forwarded to the application module only after passing the integrity check.

Yet another aspect of the invention may reside is computer program product comprising computer readable medium (e.g., data store 260) comprising code for causing a computer (e.g., processor 230) to receive data packets 400 from a streaming-data channel 210, wherein each data packet comprises a data payload and a corresponding message integrity code MIC, code for causing a computer to processing received data packets in a first processing mode 320 wherein the received data packets are forwarded to an application module 270 before checking the integrity of the data packets using the respective message integrity codes, code for causing a computer to generate an integrity-check-failure measurement for monitoring an integrity-check-failure rate in the first processing mode, and code for causing a computer to transition to a second processing mode 370 if the integrity-check-failure measurement exceeds an integrity-check threshold, wherein, in the second processing mode, a received data packet is forwarded to the application module only after passing the integrity check.

A wireless device may include various components that perform functions based on signals that are transmitted by or received at the wireless device. For example, a wireless headset may include a transducer adapted to provide an audio output based on a signal received via the receiver. A wireless watch may include a user interface adapted to provide an indication based on a signal received via the receiver. A wireless sensing device may include a sensor adapted to provide data to be transmitted to another device.

A wireless device may communicate via one or more wireless communication links that are based on or otherwise support any suitable wireless communication technology. For example, in some aspects a wireless device may associate with a network. In some aspects the network may comprise a body area network or a personal area network (e.g., an ultra-wideband network). In some aspects the network may comprise a local area network or a wide area network. A wireless device may support or otherwise use one or more of a variety of wireless communication technologies, protocols, or standards such as, for example, CDMA, TDMA, OFDM, OFDMA, WiMAX, and Wi-Fi. Similarly, a wireless device may support or otherwise use one or more of a variety of corresponding modulation or multiplexing schemes. A wireless device may thus include appropriate components (e.g., air interfaces) to establish and communicate via one or more wireless communication links using the above or other wireless communication technologies. For example, a device may comprise a wireless transceiver with associated transmitter and receiver components (e.g., a transmitter and a receiver) that may include various components (e.g., signal generators and signal processors) that facilitate communication over a wireless medium.

The teachings herein may be incorporated into (e.g., implemented within or performed by) a variety of apparatuses (e.g., devices). For example, one or more aspects taught herein may be incorporated into a phone (e.g., a cellular phone), a personal data assistant ("PDA"), an entertainment device (e.g., a music or video device), a headset (e.g., headphones, an earpiece, etc.), a microphone, a medical device (e.g., a biometric sensor, a heart rate monitor, a pedometer, an EKG device, etc.), a user I/O device (e.g., a watch, a remote control, a light switch, a keyboard, a mouse, etc.), a tire pressure monitor, a computer, a point-of-sale device, an entertainment device, a hearing aid, a set-top box, or any other suitable device.

In some aspects a wireless device may comprise an access device (e.g., a Wi-Fi access point) for a communication system. Such an access device may provide, for example, connectivity to another network (e.g., a wide area network such as the Internet or a cellular network) via a wired or wireless communication link. Accordingly, the access device may enable another device (e.g., a Wi-Fi station) to access the other network or some other functionality. In addition, it should be appreciated that one or both of the devices may be portable or, in some cases, relatively non-portable.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. A method for verifying data packet integrity in a streaming-data channel, comprising:
   receiving data packets from the streaming-data channel, wherein each data packet includes a data payload and a corresponding message integrity code;
   processing the received data packets in a first processing mode, wherein the received data packets are forwarded to an application module before checking the integrity of the received data packets using the respective message integrity codes, and wherein the application module does not perform checking the integrity of the received data packets;
   generating an integrity-check-failure measurement for monitoring an integrity-check-failure rate in the first processing mode; and
   if the integrity-check-failure measurement exceeds an integrity-check threshold, then transitioning to a second processing mode, wherein a received data packet is forwarded to the application module in the second processing mode only after passing the integrity check.

2. A method for verifying data packet integrity as defined in claim 1, wherein: the streaming-data channel is a bandwidth-limited streaming-data channel.

3. A method for verifying data packet integrity as defined in claim 1, wherein a reception time for receiving a data packet over the streaming-data channel exceeds about 50 milliseconds.

4. A method for verifying data packet integrity as defined in claim 1, wherein power consumed in the first processing mode is less than power consumed in the second processing mode.

5. A method for verifying data packet integrity as defined in claim 4, wherein the first processing mode is performed using an application specific integrated circuit (ASIC).

6. A method for verifying data packet integrity as defined in claim 5, wherein the integrity-check threshold comprises at least two consecutive data packets failing the integrity check.

7. A method for verifying data packet integrity as defined in claim 4, wherein the second processing mode is performed using a programmable processor.

8. A method for verifying data packet integrity as defined in claim 1, wherein the integrity check failure measurement is a count of each data packet failing the integrity check in the first processing mode.

9. A method for verifying data packet integrity as defined in claim 8, wherein the integrity-check threshold comprises one data packet failing the integrity check.

10. A method for verifying data packet integrity as defined in claim 1, wherein, in the second processing mode, a data packet having failed an integrity check is discarded.

11. A method for verifying data packet integrity as defined in claim 1, wherein, in the second processing mode, data packets having failed an integrity check are analyzed for a security assessment.

12. A method for verifying data packet integrity as defined in claim 1, wherein the application module includes an audio processing circuit that generates audio signals based on the forwarded data packets.

13. A method for verifying data packet integrity as defined in claim 1, further comprising:
   generating an integrity-check-success measurement for monitoring an integrity-check-success rate in the second processing mode; and
   if the integrity-check-success measurement exceeds an integrity-check-success threshold, then transitioning to the first processing mode.

14. Apparatus for verifying data packet integrity in a streaming-data channel, comprising:
   means for receiving data packets from the streaming-data channel, wherein each data packet includes a data payload and a corresponding message integrity code;
   means for processing the received data packets in a first processing mode, wherein the received data packets are forwarded to an application module before checking the integrity of the received data packets using the respective message integrity codes, and wherein the application module does not perform checking the integrity of the received data packets;
   means for generating an integrity-check-failure measurement for monitoring an integrity-check-failure rate in the first processing mode; and
   means for transitioning to a second processing mode if the integrity-check-failure measurement exceeds an integrity-check threshold, wherein, in the second processing mode, a received data packet is forwarded to the application module only after passing the integrity check.

15. Apparatus for verifying data packet integrity as defined in claim 14, wherein:

the streaming-data channel is a bandwidth-limited streaming-data channel.

16. Apparatus for verifying data packet integrity as defined in claim 14, wherein a reception time for receiving a data packet over the streaming-data channel exceeds about 50 milliseconds.

17. Apparatus for verifying data packet integrity as defined in claim 14, wherein power consumed in the first processing mode is less than power consumed in the second processing mode.

18. Apparatus for verifying data packet integrity as defined in claim 14, wherein the integrity-check-failure measurement is a count of each data packet failing the integrity check in the first processing mode.

19. Apparatus for verifying data packet integrity as defined in claim 18, wherein the integrity-check threshold comprises one data packet failing the integrity check.

20. Apparatus for verifying data packet integrity as defined in claim 18, wherein the integrity-check threshold comprises at least two consecutive data packets failing the integrity check.

21. Apparatus for verifying data packet integrity as defined in claim 14, wherein, in the second processing mode, a data packet having failed an integrity check is discarded.

22. Apparatus for verifying data packet integrity as defined in claim 14, wherein, in the second processing mode, data packets having failed an integrity check are analyzed for a security assessment.

23. Apparatus for verifying data packet integrity as defined in claim 14, further comprising:
   means for generating an integrity-check-success measurement for monitoring an integrity-check-success rate in the second processing mode; and
   means for transitioning to the first processing mode if the integrity-check-success measurement exceeds an integrity check success threshold.

24. A watch for wireless communications, comprising:
   means for receiving data packets from a streaming-data channel, wherein each data packet includes a data payload and a corresponding message integrity code;
   means for processing the received data packets in a first processing mode, wherein the received data packets are forwarded to an application module before checking the integrity of the received data packets using the respective message integrity codes, and wherein the application module does not perform checking the integrity of the received data packets;
   means for generating an integrity-check-failure measurement for monitoring an integrity-check-failure rate in the first processing mode; and
   means for transitioning to a second processing mode if the integrity-check-failure measurement exceeds an integrity-check threshold, wherein, in the second processing mode, a received data packet is forwarded to the application module only after passing the integrity check.

25. A headset for wireless communications, comprising:
   means for receiving data packets from a streaming-data channel, wherein each data packet includes a data payload and a corresponding message integrity code;
   means for processing the received data packets in a first processing mode, wherein the received data packets are forwarded to an application module before checking the integrity of the received data packets using the respective message integrity codes, and wherein the application module does not perform checking the integrity of the received data packets;
   means for generating an integrity-check-failure measurement for monitoring an integrity-check-failure rate in the first processing mode; and
   means for transitioning to a second processing mode if the integrity-check-failure measurement exceeds an integrity-check threshold, wherein, in the second processing mode, a received data packet is forwarded to the application module only after passing the integrity check.

26. A sensing device for wireless communications, comprising:
   means for receiving data packets from a streaming-data channel, wherein each data packet includes a data payload and a corresponding message integrity code;
   means for processing the received data packets in a first processing mode, wherein the received data packets are forwarded to an application module before checking the integrity of the received data packets using the respective message integrity codes, and wherein the application module does not perform checking the integrity of the received data packets;
   means for generating an integrity-check-failure measurement for monitoring an integrity-check-failure rate in the first processing mode; and
   means for transitioning to a second processing mode if the integrity-check-failure measurement exceeds an integrity-check threshold, wherein, in the second processing mode, a received data packet is forwarded to the application module only after passing the integrity check.

27. A computer program product, comprising:
   non-transitory computer readable medium, comprising:
      code for causing a computer to receive data packets from a streaming-data channel, wherein each data packet includes a data payload and a corresponding message integrity code;
      code for causing a computer to process received data packets in a first processing mode, when the received data packets are forwarded to an application module before checking the integrity of the received data packets using the respective message integrity codes, and wherein the application module does not perform checking the integrity of the received data packets;
      code for causing a computer to generate an integrity-check-failure measurement for monitoring an integrity-check-failure rate in the first processing mode; and
      code for causing a computer to transition to a second processing mode if the integrity-check failure measurement exceeds an integrity-check threshold, wherein, in the second processing mode, a received data packet is forwarded to the application module only after passing the integrity check.

28. A computer program product as defined in claim 27, wherein:
   the streaming-data channel is a bandwidth-limited streaming-data channel.

29. A computer program product as defined in claim 27, wherein a reception time for receiving a data packet over the streaming-data channel exceeds about 50 milliseconds.

30. A computer program product as defined in claim 27, wherein the integrity-check-failure measurement is a count of each data packet failing the integrity check in the first processing mode.

31. A computer program product as defined in claim 30, wherein the integrity-check threshold comprises one data packet failing the integrity check.

32. A computer program product as defined in claim 30, wherein the integrity-check threshold comprises at least two consecutive data packets failing the integrity check.

33. A computer program product as defined in claim 27, wherein, in the second processing mode, a data packet having failed an integrity check is discarded.

34. A computer program product as defined in claim 27, wherein, in the second processing mode, data packets having failed an integrity check are analyzed for a security assessment.

35. A computer program product as defined in claim 27, wherein the application module includes an audio processing circuit that generates audio signals based on the forwarded data packets.

36. A computer program product as defined in claim 27, further comprising:
  code for causing a computer to generate an integrity-check-success measurement for monitoring an integrity-check-success rate in the second processing mode; and
  code for causing a computer to transition to the first processing mode if the integrity-check-success measurement exceeds an integrity-check-success threshold.

37. Apparatus for verifying data packet integrity in a streaming-data channel, comprising:
  a receiver configured to receive data packets from the streaming-data channel, wherein each data packet includes a data payload and a corresponding message integrity code;
  a first processor configured to:
    process the received data packets in a first processing mode, wherein the received data packets are forwarded to an application module before checking the integrity of the received data packets using the respective message integrity codes, and wherein the application module does not perform checking the integrity of the received data packets;
    generate an integrity-check-failure measurement for monitoring an integrity-check-failure rate in the first processing mode; and
    transition to a second processing mode performed by second processor if the integrity-check-failure measurement exceeds an integrity-check threshold; and
  the second processor configured to forward a received data packet to the application module, in the second processing mode, only after the received packet passes an integrity check.

38. Apparatus for verifying data packet integrity as defined in claim 37, wherein:
  the streaming-data channel is a bandwidth-limited streaming-data channel.

39. Apparatus for verifying data packet integrity as defined in claim 37, wherein a reception time for receiving a data packet over the streaming-data channel exceeds about 50 milliseconds.

40. Apparatus for verifying data packet integrity as defined in claim 37, wherein power consumed in the first processing mode is less than power consumed in the second processing mode.

41. Apparatus for verifying data packet integrity as defined in claim 37, wherein the first processor is implement in dedicated hardware.

42. Apparatus for verifying data packet integrity as defined in claim 37, wherein the first processor comprises an application specific integrated circuit (ASIC).

43. Apparatus for verifying data packet integrity as defined in claim 37, wherein the second processor is a programmable processor.

44. Apparatus for verifying data packet integrity as defined in claim 37, wherein the integrity-check-failure measurement is a count of each data packet failing the integrity check in the first processing mode.

45. Apparatus for verifying data packet integrity as defined in claim 44, wherein the integrity-check threshold comprises one data packet failing the integrity check.

46. Apparatus for verifying data packet integrity as defined in claim 44, wherein the integrity-check threshold comprises at least two consecutive data packets failing the integrity check.

47. Apparatus for verifying data packet integrity as defined in claim 37, wherein, in the second processing mode, a data packet having failed an integrity check is discarded.

48. Apparatus for verifying data packet integrity as defined in claim 37, wherein, in the second processing mode, data packets having failed an integrity check are analyzed for a security assessment.

49. Apparatus for verifying data packet integrity as defined in claim 37, wherein the second processor is further configured to:
  generate an integrity-check-success measurement for monitoring an integrity-check-success rate in the second processing mode; and
  transition to the first processing mode if the integrity-check-success measurement exceeds an integrity check success threshold.

\* \* \* \* \*